United States Patent [19]

Vieslet et al.

[11] Patent Number: 5,587,120
[45] Date of Patent: Dec. 24, 1996

[54] METHOD FOR SHAPING A POLYMER MIXTURE INTO A BLOCK WITH A STABLE SHAPE AND SIZE

[76] Inventors: Jean-Paul B. Vieslet, Rue Bouhette 92/31, B 4420 Montegnee, Belgium; Bernard P. Vieslet, Apar. 12A, Collinas de Bello Monte, Edie. Rio Aranca, Caracas, Venezuela; Pierre G. Poswick, Servitude de la Dreve 3, B-7050 Erbisoful, Belgium

[21] Appl. No.: 525,579
[22] PCT Filed: Mar. 15, 1994
[86] PCT No.: PCT/BE94/00022
 § 371 Date: Nov. 6, 1995
 § 102(e) Date: Nov. 6, 1995
[87] PCT Pub. No.: WO94/21435
 PCT Pub. Date: Sep. 29, 1994

[30] Foreign Application Priority Data

Mar. 16, 1993 [BE] Belgium ................................ 9300249

[51] Int. Cl.⁶ .................................................... B29C 35/02
[52] U.S. Cl. ............................................. 264/118; 264/122
[58] Field of Search ............................. 264/122, 126, 264/118

[56] References Cited

U.S. PATENT DOCUMENTS

5,482,665  1/1996  Gill ........................................... 264/113

FOREIGN PATENT DOCUMENTS

| 0410835 | 1/1991 | European Pat. Off. . |
| 3024229 | 1/1982 | Germany . |
| 4117797 | 12/1992 | Germany . |
| 9208143 | 1/1993 | Germany . |

*Primary Examiner*—Mary Lynn Theisen
*Attorney, Agent, or Firm*—Ladas & Parry

[57] ABSTRACT

A basic block with a stable shape and size is shaped from fragments of a polymer mixture compressed in a hydraulic press (1) b piercing the block with spikes (8) heated to a temperature higher than the softening point of at least one of the polymers in said m 8 Claims, 3 Drawing Sheets

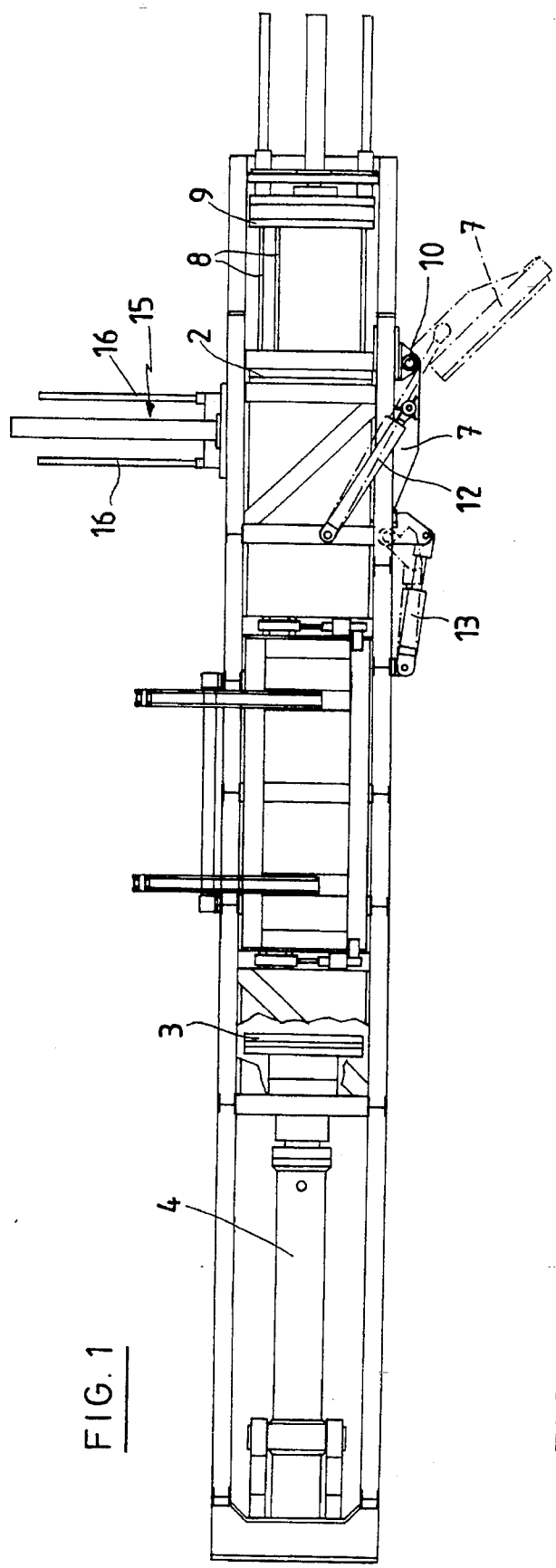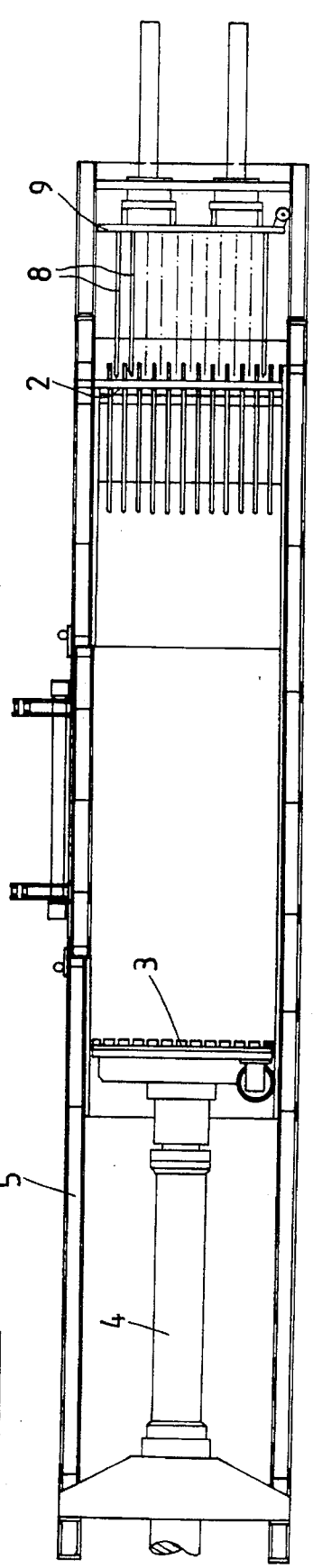
FIG. 1
FIG. 2

METHOD FOR SHAPING A POLYMER MIXTURE INTO A BLOCK WITH A STABLE SHAPE AND SIZE

The present invention relates to a method for shaping an elementary block of stable shape and size from a polymer mixture which is compressed and constrained under a load into a defined volume of a hydraulic press, a dead volume of which is provided with spikes heated to a temperature above the softening point of at least one of the polymers of the aforementioned mixture, so as to form a block transpierced by the said spikes.

It finds its main application in civil engineering, in particular in earth works, soil lightening, insulation, drainage, earthquake protection, underground protection in mines and galleries, protection against surface cave-in, acoustic panels, cladding, movable civil-engineering structures (road bridges for passing over marshes).

It makes it possible to produce solid bodies having a bearing capacity and a structure which are appreciably better than those of a soil, exhibiting properties of continuity, flexibility, deformability and tensile strength. Practical examples of application are the playing grounds development of parking lots, sports areas, parks and sports terrains.

A method of reinforcing in-fill soil using a reinforcing structure composed of raw reused plastic textile waste, as a mixture without any conversion, is disclosed in Document EP-A-371,898.

The waste, which has a density very much less than that of soil, is highly compacted and then tied up in order to form parallelepipedal blocks of approximately 1 m$^3$ and of density from 0.3 to 0.6 depending on the envisaged use. The method finds its main application in the construction of lightweight in-filling on compressible soils. However, the material is viscoelastic, sensitive to creep and also highly deformable immediately after releasing the hydraulic stress on expansion.

Document DE-U-9,208,143 describes a hydraulic press intended to compress fragments of a polymer mixture which is brought to the melting point by partial heating by means of heating spikes attached to a fixed platen forming the end wall of the hydraulic press. During compression, the objects not yet melted tend to push back the heating rods, deflect them and permanently deform them.

Likewise document DE-A-4,117,797 describes a similar hydraulic press in which the heating spikes are attached to the moving platen. While they are being inserted, the spikes encounter obstacles which oppose them with an increasing resistance and tend to be deflected from their straight path and to be deformed.

The present invention aims to overcome the aforementioned drawbacks. It provides, with a view to achieving internal cohesion of the fragments of the polymer mixture by transpiercing the block using spikes raised to a temperature above the softening point of at least one of the polymers of the aforementioned mixture, a method as described in the preamble of the herein-attached claim 1.

According to the invention, spikes (8), carried by a second moving platen (9) arranged with respect to the first moving platen (3), on the other side of the fixed platen (2) forming the end wall of the press (1), are made to penetrate, via orifices provided through the fixed platen (2) forming the end wall of the press, into the bale of polymers previously compacted in the dead volume of the press, during or after compression.

As raw material, the method uses recovery and/or scrap material, more particularly material scrap resulting from industrial processes and/or residual matter, sorted or unsorted, originating from the consumer market.

These raw materials are gathered and/or preconditioned according to well-known standards and are conveyed into a chamber where they may possibly be taken to a temperature of between −40° C. to +1000° C., thus transforming their rheological characteristics.

These raw materials are gathered and/or preconditioned according to well-known standards and are conveyed into an enclosure where they may possibly be taken to a temperature of between −40° C. and +1000° C., thus transforming their theological characteristics.

These raw materials taken to a suitable temperature depending on their final use are directed to one or more weighing, homogenization, preshaping, densification and/or precompression chambers.

These preconverted materials are introduced into one of the main pressing feed chambers where they are then compressed at a pressure which can be adjusted between 10$^6$ and 2×10$^6$ Pa depending on the starting product and on the desired final use so as to obtain a completely controlled density and/or volume.

When these materials have reached the point of final forming, partly by virtue of the reactive sintering of the polymer fragments, they have a monolithic and stable compact shape.

The method comprises the introduction, into the possibly already formed mass, of spikes raised to a working temperature above the softening temperature of at least some of the polymers. These spikes enable channels to be created through the mass of the block. A variant of the method enables the materials to be compressed into the final volume while the hot spikes are already in place at the desired temperature, thereby having the effect of creating an agglomeration of the thermoplastics throughout the (low- and high-pressure) compression operation.

The channels thus formed or in the course of being formed may serve for the injection of heat-transfer or cryogenic fluids or else of any other materials for obtaining the desired final characteristics.

The effect of the channels is to bond the various blocks together and/or to stiffen them and/or to keep them in their shape.

The channels formed my serve as anchoring points for the hook or hooks of a lifting machine or the fork of a lift truck for the purpose of making it easier to handle and to use the blocks. They may also enable the density to be adjusted.

The method may employ entirely miscellaneous materials, possibly mixed and relatively dirtied. There is no need for prior reformulation of the components by means of additives for the purpose of making them compatible. It makes it possible to use, as they are, materials which would be incompatible in other methods.

Furthermore, the method requires no or little cleaning and drying of the raw material. Relatively-wet materials may be used.

The tear strength of the slices of blocks which are sawn to the desired thickness is very high since the sheets of material, through the action of the loading, orient in the direction of the force. Creep due to the mechanical stresses is reduced by virtue of the presence of rigid bonds which distribute the point loadings over a wide field.

The initial modulus is low, considering that the sliding bonds do not become blocked until after a certain degree of deformation.

The method enables very large quantities of mixed plastic waste to be upgraded. By dint of its simplicity, the method constitutes an ecological solution to the expensive problem of sorting and of recycling.

Virtually all essentially flexible and semi-rigid types of plastics may be compressed and converted into blocks. The waste is distributed randomly in the compressed block. The method may comprise the incorporation into the mass of the block of a heat-meltable additional material. The method reduces the spread of non-degradable plastics in the wild.

The method may accept, in very large quantities, all flexible or semi-rigid plastics from whatever point of collection, sorting or gathering, even if these plastics are heterogeneous or soiled, and having a percentage less than 15% of fragments of rigid plastic or of another material having a melting point below 400°C.

The porosity of the thermally welded blocks is very low, virtually zero. The flow of water is achieved only by the perforations provided after compressing the block. Above a certain defined density, depending on the thermoplastics used, the porosity of the blocks is zero and the flow of water impossible, something which makes it possible to keep a water table or a water course intact.

The invention explained hereinabove in its general form will be easier to understand on reading the following description and on examining the appended drawings which represent, by way of non-limiting example, a preferred embodiment to which the following description makes reference.

In these drawings

FIG. 1 is a longitudinal sectional view of a bundling hydraulic press provided with heating spikes;

FIG. 2 is a plan view of the press shown in FIG. 1;

In these figures, the same reference symbols designate identical or similar elements.

Figure 3:
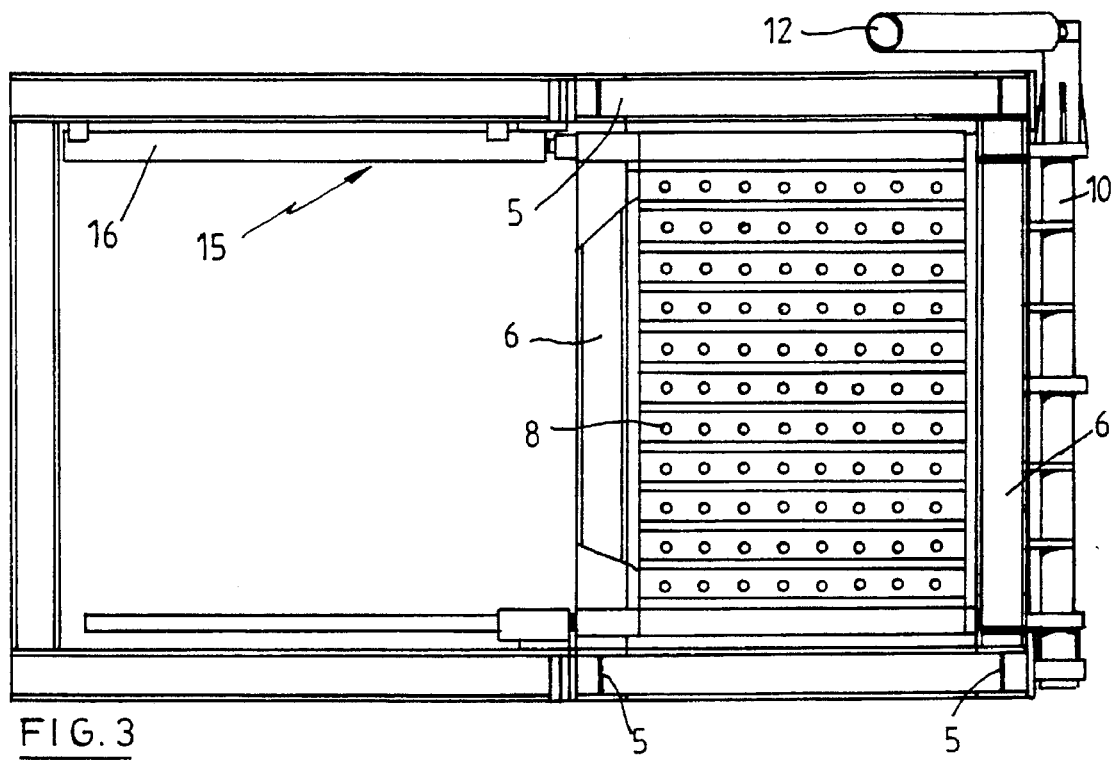
FIG. 3 is an end view of the press shown in FIGS. 1 and 2 and of the expulsion cylinders.
Figure 5:
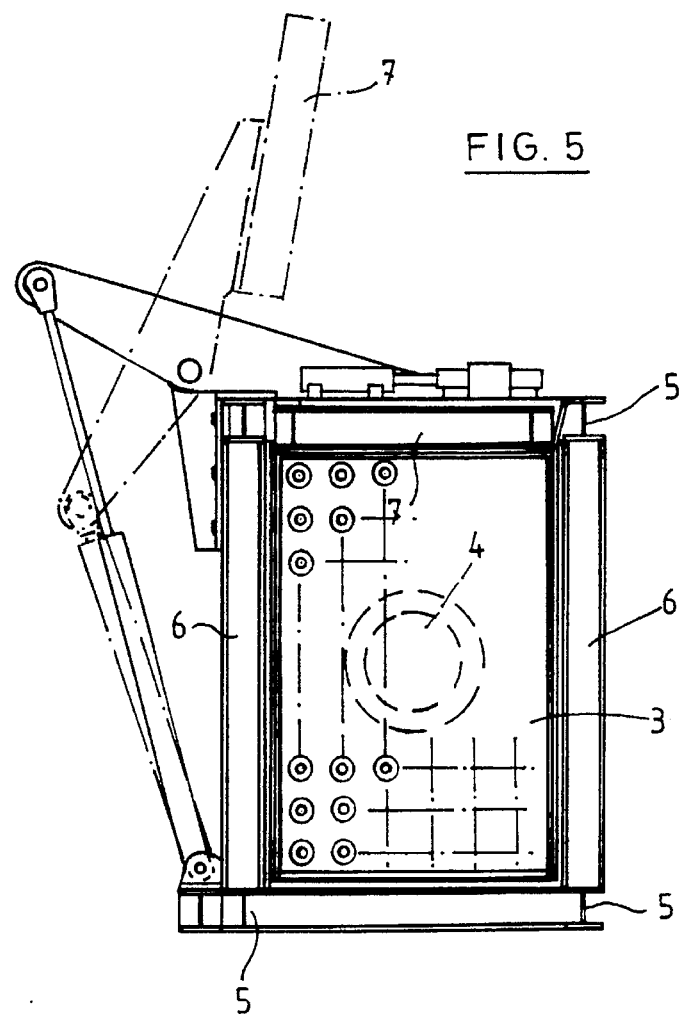
FIG. 4 is a partial view in side elevation of the side door of the hydraulic press illustrated in FIGS. 1 to 3 and FIG. 5 is an end view of a second, upper, side door.
Figure 4:
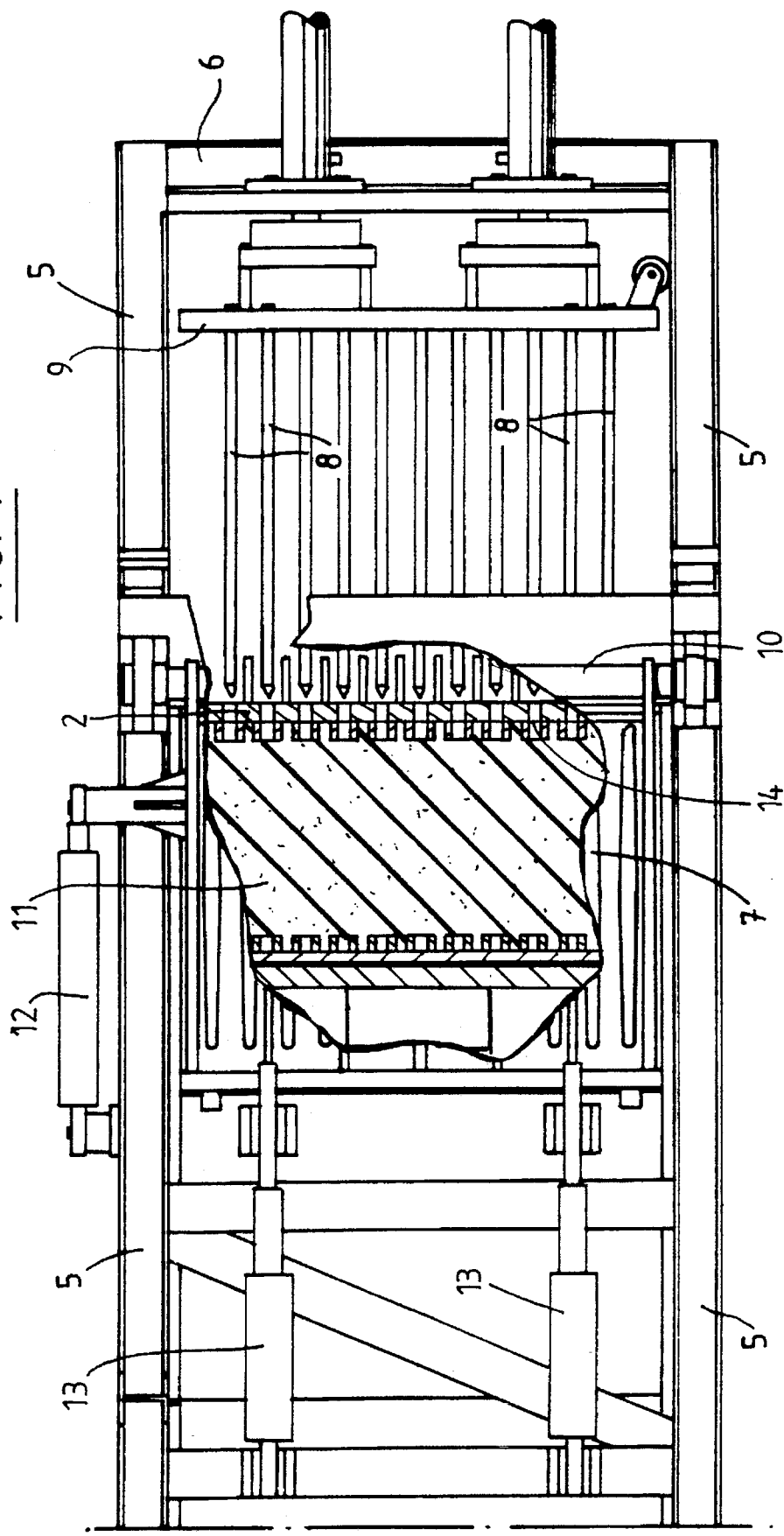

The machine intended to form the blocks of compressed plastic is a horizontal hydraulic bundling press 1.

It consists of a fixed vertical platen 2, a moving platen 3 attached to a piston 4 held by four ties 5 and side walls delimiting a cage of variable volume, within which the moving platen 3 moves at a speed of between 2 and 4 m/min.

A hydraulic power unit, not shown, comprising in a known way a hydraulic pump and an accumulator of approximately 200 bar, provides the movement of the piston 4.

The plastic waste to be compressed, flattened beforehand, possibly using a continous-feed screw press, is brought between the platens 2, 3 of the hydraulic press. These platens 2, 3, possibly equipped with a heating structure, form with the side walls 6 of the press a cage of variable volume in which the material undergoes transverse folding when it is compressed at a pressure of from 1 to $2\times10^6$ Pa (10 to 20 bar) through a thrust effect from the moving platen of from 125 to 150 t.

Such a hydraulic press works in batch mode and processes successive charges. The hydraulic press 1 is made easier to use by the provision of an armoured side door 7 which is pivoted about the hinges 10, actuated by the cylinders 12 and locked by the cylinders 13, making it possible to extract the compressed bale without trouble. This fixed platen of the press may include heating spikes 8 passing right through the dead volume of the hydraulic bundling press. Forming oblong internal cohesion and retention zones around the aforementioned channels makes it possible to bundle up the bale. The cavities of hardened material surrounding the channels, formed according to the invention by the heating spikes, constitute braces which produce the internal bonding of the block 11. A side ejector 15 actuated by cylinders 16 enables the block 11 to be pushed away as soon as it is rigid enough after cooling.

The press according to the invention may also serve to bundle up metal turning chips.

We claim:

1. Method for shaping an elementary block of stable shape and size from fragments of a polymer mixture which is compressed and constrained under a load into a defined volume of a hydraulic press (1), comprising at least one dead volume delimited by a first moving platen (3) moved into end of travel by a piston (4) and a fixed platen (2) constituting the end wall of the press, so as to form a bale of compacted fragments of a polymer mixture which is transpierced by spikes (8) heated to a temperature above the softening point of at least one of the polymers of the aforementioned mixture, wherein spikes (8), carried by a second moving platen (9) arranged with respect to the first moving platen (3), on the other side of the fixed platen (2) forming the end wall of the press (1), are made to penetrate, via orifices provided through the fixed platen. (2) forming the end wall of the press, into the bale of polymers previously compacted in the dead volume of the press, during or after compression.

2. Method according to claim 1, wherein the spikes (8) carried by the second moving platen (9) are heated to a working temperature above the melting temperature of at least one of the polymers.

3. Method according to claim 1, wherein retracting the spikes (8) from the block enables perforations to be created through the mass of the block, these stiffening the block and keeping it in its shape.

4. Method according to claim 1, wherein the installing of hollow objects of various shapes in the dead volume of the press, at predefined points, enables conduits or cavities to be made which are intended to serve as the seating for pipes or cables.

5. Method according to claim 1, wherein the aforementioned perforations create conduits serving for the injection of heat-transfer or cryogenic fluids.

6. Method according to claim 1, wherein the block provided with retaining means is sized by sawing the faces and in that the block is sawn up into transverse slices.

7. Hydraulic bundling press comprising a first movable platen (3) actuated by a piston (4) and a fixed platen (2), wherein the fixed platen (2) is provided with orifices (14) through which heating spikes (8), carried by a second moving platen (9) arranged with respect to a block on the other side of the fixed platen (2), are introduced parallel to the longitudinal axis of the press so as to pass through the block to be shaped.

8. Hydraulic press according to Claim 7, wherein that heating spikes (8) are introduced horizontally, vertically or transversely to the press, through orifices made in a side wall of the press, so as to pass right through the compressed block.

* * * * *